(12) United States Patent
Han

(10) Patent No.: US 8,446,622 B2
(45) Date of Patent: May 21, 2013

(54) TERMINAL APPARATUS TO CONTROL A PRINTING OPERATION AND METHOD THEREOF

(75) Inventor: Young-soo Han, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 838 days.

(21) Appl. No.: 12/534,328

(22) Filed: Aug. 3, 2009

(65) Prior Publication Data

US 2010/0128306 A1    May 27, 2010

(30) Foreign Application Priority Data

Nov. 24, 2008  (KR) .......................... 10-2008-117088

(51) Int. Cl.
*G06F 3/12*   (2006.01)
(52) U.S. Cl.
USPC ........................................ 358/1.15; 358/1.13
(58) Field of Classification Search
USPC  . 358/1.13, 1.15, 1.9, 1.2, 1.18, 447; 709/219, 709/246, 206
See application file for complete search history.

(56) References Cited

U.S. PATENT DOCUMENTS

| 5,781,711 | A | * | 7/1998 | Austin et al. ............... 358/1.15 |
| 2006/0028667 | A1 | | 2/2006 | Saito |
| 2009/0147308 | A1 | * | 6/2009 | Hasegawa ................... 358/1.15 |

OTHER PUBLICATIONS

Extended European Search Report issued Sep. 16, 2010 in EP Application No. 09169208.7.

* cited by examiner

*Primary Examiner* — Jerome Grant, II
(74) *Attorney, Agent, or Firm* — Stanzione & Kim, LLP

(57) ABSTRACT

A terminal apparatus to control a printing operation having a user interface to receive a selection of an optimize option when a command to print a XPS file is received, a filter unit to process the XPS file using at least one filter corresponding to the received optimize option, and a controller to transmit the XPS file which has been processed by the filter unit with the at least one filter to an image forming apparatus. Accordingly, the ease of selecting an optimize option for an XPS file is increased.

18 Claims, 6 Drawing Sheets

TERMINAL APPARATUS TO CONTROL A PRINTING OPERATION AND METHOD THEREOF

CROSS-REFERENCE TO RELATED APPLICATIONS

This application claims all benefits accruing under 35 U.S.C. §119 (a) from Korean Patent Application No. 2008-117088, filed on Nov. 24, 2008, in the Korean Intellectual Property Office, the disclosure of which is incorporated herein by reference.

BACKGROUND

1. Field of the Invention

The present general inventive concept relates a terminal apparatus to control a printing operation and a method thereof, and more particularly, to a terminal apparatus to control a printing operation, to select a filter for an extensible markup language (XML) paper specification (XPS) file, and a method thereof.

2. Description of the Related Art

The term "image forming apparatus," as used herein, refers to an apparatus that prints printing data generated by a terminal apparatus such as a computer on a recording medium. Such image forming apparatuses may be photocopiers, printers, facsimile machines or multifunction peripherals (MFP) combining two or more functions of the aforementioned devices.

Recently, the image forming apparatus supports a direct printing function with respect to documents of PDF, TIFF, and JPG formats. The direct printing function refers to a function for directly printing a document simply by transmitting a file to the image forming apparatus without executing an extra application on a terminal apparatus such as a PC, a laptop computer, a PDA, and a digital camera.

As data for supporting such a direct printing function, a XPS file is exemplified. The XPS file, which is an electronic file of a fixed layout capable of maintaining a document template and of being shared with another file, organizes all resources necessary for a document or a job in a directory structure and packs data describing reference relationship among the resources using XML (extensible markup language) and the resources in a ZIP format. The XPS file has a logical structure of a tree shape having a plurality of layers as illustrated in FIG. 6.

FIG. 6 is a conceptual view to explain a logical structure of the XPS file.

Referring to FIG. 6, printing option information set in the XPS file is defined in a PrintTicket in the XPS file and has a hierarchical structure comprising a job level, a document level, and a page level. The document level and the page level may include a plurality of documents and a plurality of pages, respectively, and different printing option may be set for each document and each page. More specifically, the printing settings in the job level are applied to the whole job, the printing settings in the document level are applied to a corresponding document, and the printing settings in the page level are applied to a corresponding page only.

However, the image forming apparatus requires a higher level of resource in processing the XPS file than in processing data written in a conventional print description language (PDL). Therefore, an XPS driver, which is disposed in the terminal apparatus providing the XPS file, should include a XPS printer filter pipeline path to perform various pre-processes and transmit the pre-processed XPS file to the image forming apparatus, thereby reducing the load of resource to the image forming apparatus.

However, a user is not allowed to select a filter used in the XPS driver printer filter pipeline to perform various pre-processes and also cannot easily learn which pre-process has been performed.

SUMMARY

Example embodiments of the present general inventive concept provide a terminal apparatus to control a printing operation to select a filter for a XPS file, and a method thereof.

Additional embodiments of the present general inventive concept will be set forth in part in the description which follows and, in part, will be obvious from the description, or may be learned by practice of the general inventive concept.

Example embodiments of the present general inventive concept may be achieved by providing a terminal apparatus to control a printing operation which is connectible to an image forming apparatus, the terminal apparatus including a user interface to receive a selection of an optimize option when a command to print a XPS file is received, a filter unit to process the XPS file using at least one filter corresponding to the received selection of the optimize option, and a controller to transmit the XPS file which has been processed by the filter unit to the image forming apparatus.

The optimize option may be at least one of an auto mode in which the filter is automatically selected according a performance of the image forming apparatus, a manual mode to receive a selection of which of the at least one filter is applied, and a recommendation mode in which at least one filter which is selected according to the performance of the image forming apparatus is displayed to the user and one or more selection of whether to apply each of the selected filters are received.

The auto mode may determine the performance of the image forming apparatus by a performance item of the image forming apparatus, and select the at least one filter according to a result of determination.

The user interface may display a filter which has been used to process the XPS file.

The at least one filter may include a transparency removal filter, and the auto mode may select the transparency removal filter when a memory capacity of the image forming apparatus is less than a pre-set capacity.

The user interface may generate a UI window to display a first area to display at least one filter which can be applied to the XPS file and a second area to receive a corresponding selection of the at least one filter.

The at least one filter displayed on the first area may be added or deleted by a received selection.

The at least one filter displayed on the first area may be changed in its display order by a received selection.

The terminal apparatus may further include a storage unit to store the XPS file which has been processed by the filter unit.

The terminal apparatus may further include a storage unit to store a history on the filter which has been used to process the XPS file, and the auto mode and the recommendation mode may select the at least one filter according to the history.

Example embodiments of the present general inventive concept may also be achieved by providing a method of controlling printing operation of a terminal apparatus which is connectible to an image forming apparatus, the method including receiving a command to print a XPS file, receiving a selection of an optimize option according to the XPS file, processing the XPS file using at least one filter corresponding to the received selection of the optimize option, and transmitting the XPS file which has been processed to the image forming apparatus.

The optimize option may be at least one of an auto mode in which the filter is automatically selected according to a performance of the image forming apparatus, a manual mode to receive a selection of which of the at least one filter is applied, and a recommendation mode in which at least one filter which is selected according to the performance of the image forming apparatus is displayed to the user and one or more selections of whether to apply each of the selected filters are received.

The auto mode may determine the performance of the image forming apparatus by a performance item of the image forming apparatus, and select the at least one filter according to a result of determination.

The method may further include displaying the filter which has been used to process the XPS file.

The at least one filter may include a transparency removal filter, and the auto mode may select the transparency removal filter when a memory capacity of the image forming apparatus is less than a pre-set capacity.

The selecting the optimize option may include generating a UI window to display a first area to display at least one filter which can be applied to the XPS file and a second area to receive corresponding selection of the at least one filter.

The at least one filter displayed on the first area may be added or deleted by a received selection.

The at least one filter displayed on the first area may be changed in its display order by a received selection.

The method may further include storing the XPS file which has been processed.

The method may further include storing a history on the filter which has been used to process XPS file, and the auto mode and the recommendation mode may select the at least one filter according to the history.

The selecting the optimize option may be performed on a printer driver or an application.

Exemplary embodiments of the present inventive concept may also be achieved by providing a method of controlling a printing operation of a terminal apparatus connected to an image forming apparatus, the method including receiving a selection of an optimize option from a user interface of the terminal apparatus for a print command of a XPS file, processing the XPS file with at least one filter in a filter unit of the terminal apparatus corresponding to the received selection of the optimize option, and printing the processed XPS file with the image forming apparatus.

Exemplary embodiments of the present inventive concept may also be achieved by providing a terminal apparatus to control a printing operation that is connected to an image forming apparatus, the terminal apparatus including a user interface to receive a selection of an optimize option for a print command of a XPS, a filter unit to process the XPS file with at least one filter corresponding to the received selection of the optimize option, and a controller to transmit the processed XPS file to the image forming apparatus to be printed.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE EMBODIMENTS

Figure 1:
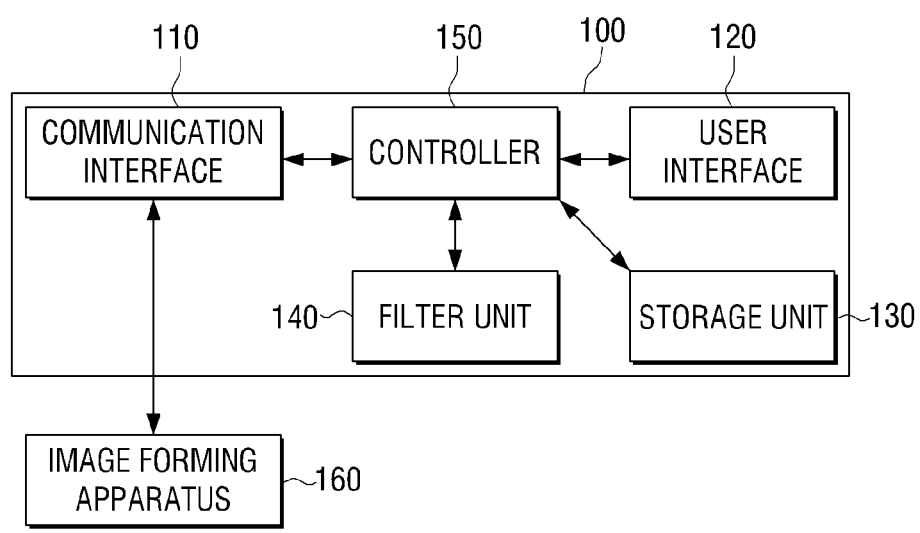
FIG. 1 is a block diagram illustrating a terminal apparatus to control printing operations according to exemplary embodiments of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a terminal apparatus to control a printing operation according to an exemplary embodiment of the present general inventive concept. Referring to FIG. 1, a terminal apparatus to control a printing operation (hereinafter, referred to as a terminal apparatus) 100 may include a communication interface 110, a user interface 120, a storage unit 130, a filter unit 140, and a controller 150.

The communication interface 110 provides printing data in a format that can be processed by an image forming apparatus 160 if the terminal apparatus 100 is connected to the image forming apparatus 160. The printing data that can be processed by the image forming apparatus may include page description language (PDL) data which are written in a printer command language (PCL) and a postscript (PS) language, image data, and an XPS file. More specifically, the communication interface 110 connects the terminal apparatus 100 to an external device and accesses the image forming apparatus 160 through a local area network (LAN), the Internet, or any other suitable communication network, as well as through a universal serial bus (USB) port or other data transfer or data communications interface.

Herein, the XPS file includes printing data in which printing options are set in a hierarchical tree structure having a plurality of layers including, but not limited to a job level, a document level, and a page level. The document level and the page level may include a plurality of documents and a plurality of pages, respectively, and different printing option may be set for each document and each page. The printing settings in the job level may be applied to the whole job, the printing settings in the document level are applied to a corresponding document, and the printing settings in the page level are applied to a corresponding page. The XPS file may have a plurality of layers, and a separate printing option may be set for each node of the tree structure.

Figure 6:
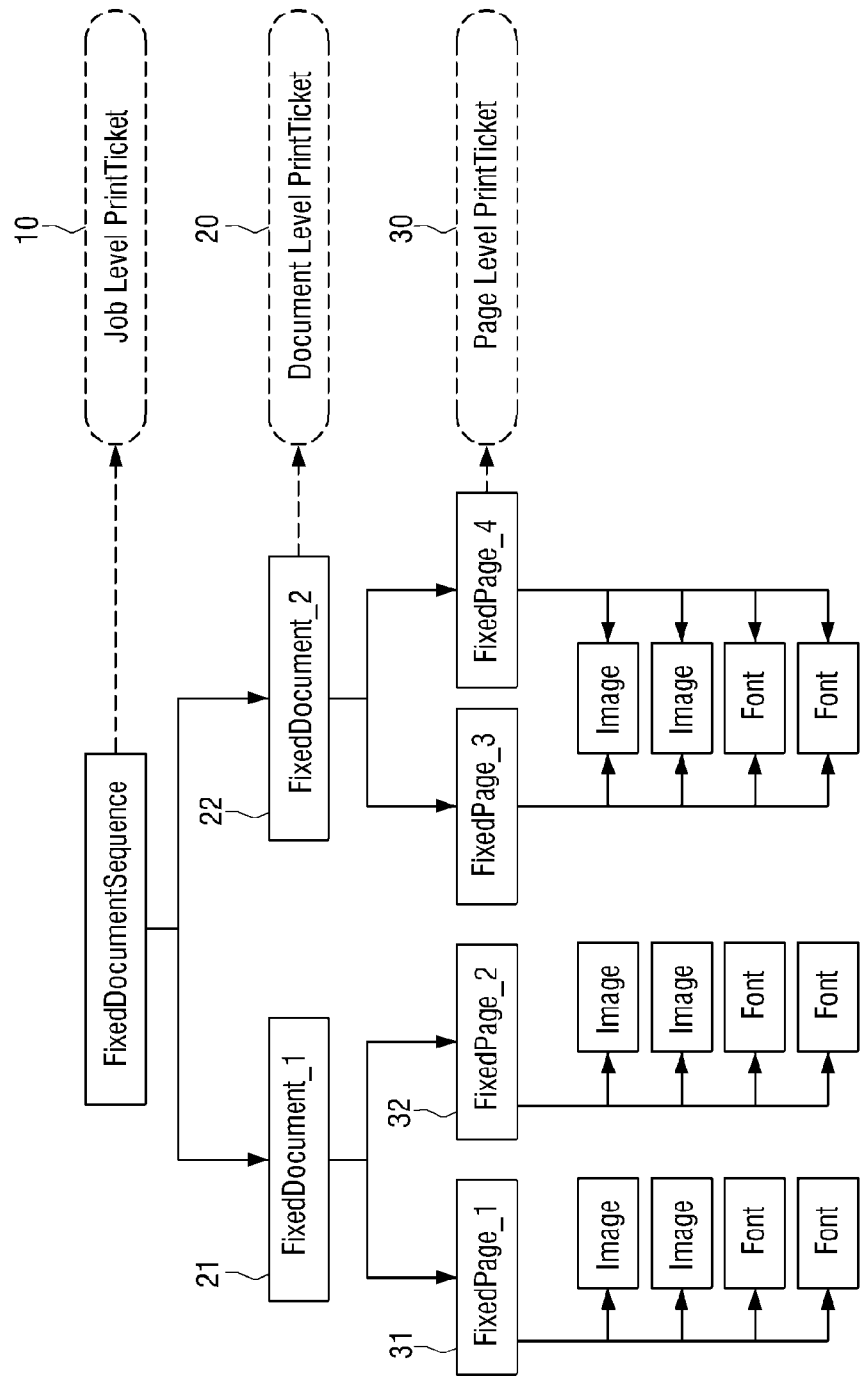
FIG. 6 is a conceptual view provided to explain a logical structure of the XPS file.

For example, as illustrated in FIG. 6, the XPS file is of layers of three levels such as a job level 10, a document level 20, and a page level 30. A plurality of printing options for document and page are set in the document level 20 and the page level 30. More specifically, a printing option of "double-sided printing" is set in the job level 10, a printing option of "2-up" is set for the first document 21 of the document level 20, a printing option of "A4 paper" is set for the first page 31 of the first document 21, and a printing option of "A5 paper" is set for the second page 32 of the first document 21. Printing options may also be set for a second document 22, or other documents. The printing option at each node of the logical structure is effectively applied to the lower layers of the node.

Referring to FIG. 1, the communication interface 110 receives performance information of the image forming apparatus from the image forming apparatus. More specifically, the communication interface 110 receives performance information regarding the performance items of the image forming apparatus, such as memory capacity, CPU performance, communication type (whether USB 2.0 or any other suitable data communications format or protocol is supported or not), and printing option that cannot be processed by the image forming apparatus. The performance information of the image forming apparatus may be received and stored (e.g., in the storage unit 130) at the time when the image forming apparatus is initially installed, or may be periodically received and updated.

The user interface 120 has a plurality of function keys to receive input from a user to set or select various functions supported by the terminal apparatus 100, and display various information provided by the terminal apparatus 100. The user interface 120 may be a device implementing input and output simultaneously, such as a touch pad, or as a device combining a mouse and a monitor, or may have any suitable user input device and display. Accordingly, the user interface 120 may receive a user selection of a XPS file and a command to print the XPS file through the various function keys.

If a command to print the XPS file is received, the user interface 120 may receive a user's selection regarding an optimize option. The user interface 120 may generate a UI (user interface) window, which includes a first area to display at least one filter which is applicable to the XPS file and a second area to receive corresponding user's selection. The at least one filter displayed on the first area may be added or deleted by the user, and the order of displaying the filter may be changed by the user. The UI window will be described in greater detail with reference to FIGS. 2 to 4 below.

The optimize option, as used herein, may include an auto mode in which a filter is automatically selected, for example, by the controller 150, according to the performance of the image forming apparatus, a manual mode in which a user has an option to select one or more of a plurality of filters to be applied, or a recommendation mode in which the one or more filters are automatically selected according to the performance of the image forming apparatus is displayed to the user so that the user can select whether to apply one or more of the selected filters. More specifically, in the auto mode, the performance information of the image forming apparatus, such as memory capacity, CPU performance, and communication type of the image forming apparatus, is received through the communication interface 110 and the performance of the image forming apparatus is determined, for example, by the controller 150. According to the performance of the image forming apparatus, a filter may be automatically selected. For example, if the image forming apparatus to print a current XPS file has good performance, for example, if a memory capacity of the image forming apparatus is greater than a pre-set memory capacity, for example, 256 MB, there is less necessity for the terminal apparatus 100 to perform a pre-process with respect to the XPS file, and accordingly, only a filter for improving a printing speed is selected. On the other hand, if the memory capacity of the image forming apparatus is less than 256 MB, the terminal apparatus 100 may perform a pre-process with respect to the XPS file, and accordingly, at least a transparency control filter may be selected. The operation of selecting the file in the auto mode may be performed according to a pre-set algorithm, which may be optimized by a developer or may be set according to the type (e.g., the one or more filters most frequently selected) and the frequency of received selections in the manual mode.

In the recommendation mode, the performance information of the image forming apparatus such as memory capacity is received through the communication interface 110, and the performance of the image forming apparatus is determined by, for example, the controller 150. According to the performance of the image forming apparatus, one or more filters are automatically selected and the one or more selected filters are displayed to the user via user interface 120. User interface 120 may include one or more selections of filters, and the controller 150 may apply each of the selected filters.

The storage unit 130 may store the XPS file. More specifically, the storage unit 130 may store a XPS file which is generated using an application program or a XPS file which has been already generated. Also, the storage unit 130 may store a XPS file which has undergone optimization through a series of processes, as will be described below. In this case, the storage unit 130 may store a history on the optimization which has been performed through a series of processes as will be described below, for example, a record on which pre-process has been performed or which filter has been used, in the form of extra history file, or may store the history by including it in the XPS file which has undergone optimization.

The storage unit 130 may be an internal storage medium or an external storage medium of the terminal apparatus 100, for example, a removable disk including a USB memory, or a web server connected to a network, or any other suitable digital storage device.

The optimization, as used herein, refers to the operation of processing a XPS file using at least one filter which corresponds to the received optimize option selection (e.g., the option received from the user).

The filter unit 140 includes at least one filter. More specifically, the filter unit 140 may include at least on of a stripping filter, a flattening filter, a transparency detection filter, and a transparency removal filter, or any other suitable filter. The filter unit 140 processes the XPS file using at least one filter which corresponds to the optimize option selected by the user. The filter, as used herein, refers to a filter for performing a pre-process prior to printing the XPS file. The operation of each filter will be described with reference to FIG. 2. The filter unit 140 may be a filter which is provided in the XPS pipeline of a conventional XPS driver or may be an extra dedicated filter. The filter unit 140 may further include various filters provided in the XPS pipeline and an extra plug-in filter, in addition to the at least one of the stripping filter, the flattening filter, the transparency detection filter, and the transparency removal filter.

The controller 150 transmits the XPS file which has been processed by the filter unit 140 to the image forming apparatus. More specifically, the controller 150 controls the filter unit 140 to apply at least one of the plurality of filters that corresponds to the optimize option selected through the user interface 120, and controls the communication interface 110 to transmit the XPS file which has been processed by the filter unit 140 to the image forming apparatus. If an image file is generated using the transparency removal filter, the controller 150 controls the communication interface 120 to transmit the generated image file to the image forming apparatus.

The controller 150 may control the user interface 120 to display the filter which has been used in the filter unit 140. More specifically, if the received optimize option is the auto mode, the controller 150 may control the user interface 120 to allow the user to check which filter has been used.

The controller 150 may store the XPS file which has been processed by at least one filter of the filter unit 140. More specifically, the controller 150 may store the XPS file which has undergone optimization using the at least one filter to the storage unit 150 in case that the XPS file is repeatedly output. The controller 150 may store the XPS file which has undergone optimization in a different XPS file name or may overwrite a XPS file already stored with the XPS file that has been processed by the filter unit 140. This operation may be performed according to a received user's selection, or may be automatically performed without an extra user command. The controller 150 may be an XPS driver encompassing the filter unit 140 or as an extra application.

The controller 150 may store the at least one filter used in the filter unit 140 or the history of the pre-process applied by the at least one filter unit 140 to the storage unit 150. The controller 150 may store the history to the XPS file which has undergone optimization or may store the history in the form of extra history file. This operation may be performed according to a received selection or may be automatically performed without an extra user command. If the same XPS file or a different XPS file additionally undergoes optimization, the history is referred to. More specifically, the controller 150 reads out the history from the storage unit 130 and transmits it to the user interface 120, such that the history is referred to when the optimization is performed according to the optimize option of the auto mode or the recommendation mode.

Figure 2:
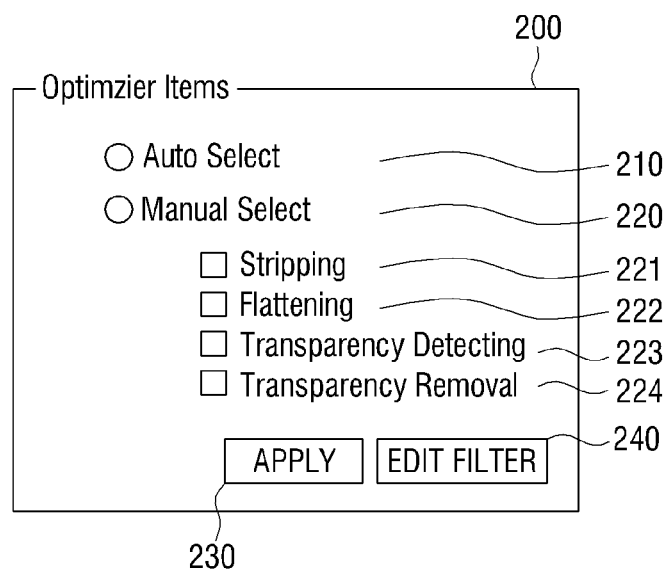
FIGS. 2-4 are views illustrating various examples of user interface windows of the terminal apparatus according to exemplary embodiments of the present general inventive concept.

Accordingly, the user can obtain information regarding the filter that can be used in the terminal apparatus 100, and can easily select a filter for the XPS file FIG. 2 is a view illustrating an example of a UI window provided by the terminal apparatus.

Referring to FIG. 2, the UI window 200 may include a first area to display at least one filter which can be applied to the XPS file and an optimize option which can be selected by the user, and a second area to receive a user's selection. More specifically, the optimize option which can be selected by the user may include an auto mode 210 or a manual mode 220 and each optimize option will be briefly described below.

If the auto mode 210 is selected, the optimization is performed using at least one filter according to the performance of the image forming apparatus, such as memory capacity. More specifically, if the memory capacity of the image forming apparatus 100 is less than a pre-set capacity, for example, 256 MB, the ease for the image forming apparatus to process a transparency printing option is reduce and thus a transparency removal filter should be selected and applied.

If the manual mode 220 is selected, the user can select which of the at least one filter is applied. UI window 20 may receive a selection of one or more of a stripping filter 221, a flattening filter 222, a transparency detection filter 223, or a transparency removal filter 224. Each of the filters will be described in detail below.

The stripping filter 221 is adapted to remove an unnecessary item for printing operation from the XPS file. More specifically, the stripping filter 221 removes thumbnail data included in the XPS file. For example, if the memory capacity of the image forming apparatus is less than a pre-set capacity, for example, 16 MB, the ease of processing a XPS file of increased file size may be reduced. The stripping filter 221 is used to reduce the size of the XPS file so that the XPS file the size of which has been reduced can be transmitted.

The flattening filter 222 may simplify data which may impose a burden on the image forming apparatus when performing rendering operation. More specifically, the XPS file may include redundancy such as a slice image which can be incorporated into a single image object, a duplicate image for the same area, and a clip path. If the redundancy is included in the XPS file, the flattening filter 222 can convert a slice image of the XPS file into a single image or remove a duplicate image, thereby reducing the complexity of the XPS file. For example, if the CPU of the image forming apparatus does not have satisfactory performance and thus if it takes a long time to render the XPS file of high complexity, the flattening filter 222 is used to reduce the complexity of the XPS file and transmit the simplified XPS file to the image forming apparatus.

The transparency detection filter 223 may determine whether a transparency option for the XPS file is set or not and transmit corresponding information to the image forming apparatus. More specifically, if transparency for the XPS file is set, a memory resource may be used to render the transparency. Accordingly, the transparency detection filter 223 notifies the image forming apparatus whether a transparency option for the XPS file is set or not so that the image forming apparatus can increase efficacy with its use of memory.

The transparency removal filter 224 generates an image file after rendering a page in which a transparency option is set in advance and transmit the image file instead of the page in which the transparency option is set. More specifically, if the level of resource of the image forming apparatus is low, for example, if the memory capacity of the image forming apparatus is less than 256 MB, it is difficult for the image forming apparatus to process the transparency printing option with respect to a color image. The transparency removal filter 224 is used to render the page of the XPS file in which the transparency option is set in advance to generate an image file and transmit the generated image file instead of the page of the XPS file in which the transparency option is set.

As described above, a pre-process may be selectively performed with respect to the XPS file by receiving a selection of the optimize option and the filter displayed on the UI window 200.

The at least one filter displayed for the manual mode 220 may be added or deleted according to a received selection (e.g., from a user) and the order of displaying the filters may be changed according to the received selection. This operation may be performed through a filter edition menu 240 of the UI window, which will be described with reference to FIG. 4 later.

Figure 3:
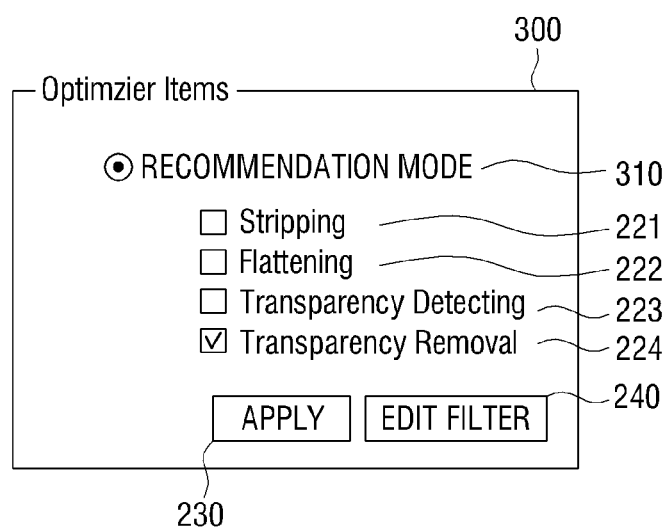

FIG. 3 is a view illustrating another example of a UI window 300 provided by the terminal apparatus.

Referring to FIG. 3, the optimize option which may receive a selection that may include a recommendation mode 310 in addition to the auto mode 210 and the manual mode 220 illustrated in FIG. 2. The recommendation mode 310 is similar to the auto mode 210 in its operation, but differs from the auto mode 210 in that, for example, it displays at least one filter selected according to the performance of the image forming apparatus and receives a selection regarding whether to apply one or more of the selected filters. More specifically, if the memory capacity of the image forming apparatus 100 is less than a pre-set capacity, for example, 256 MB, the ease of the image forming apparatus 100 to process the transparency printing option may be reduced. The transparency removal filter may be displayed to the user with a pre-checked check box.

Although the recommendation mode 310 and the auto mode 210 and the manual mode 220 are displayed on a separate UI window (e.g., UI windows 300 and 200, respectively), the auto mode 210, the manual mode 220, and the recommendation mode 310 may be displayed on a single UI window.

Figure 4:
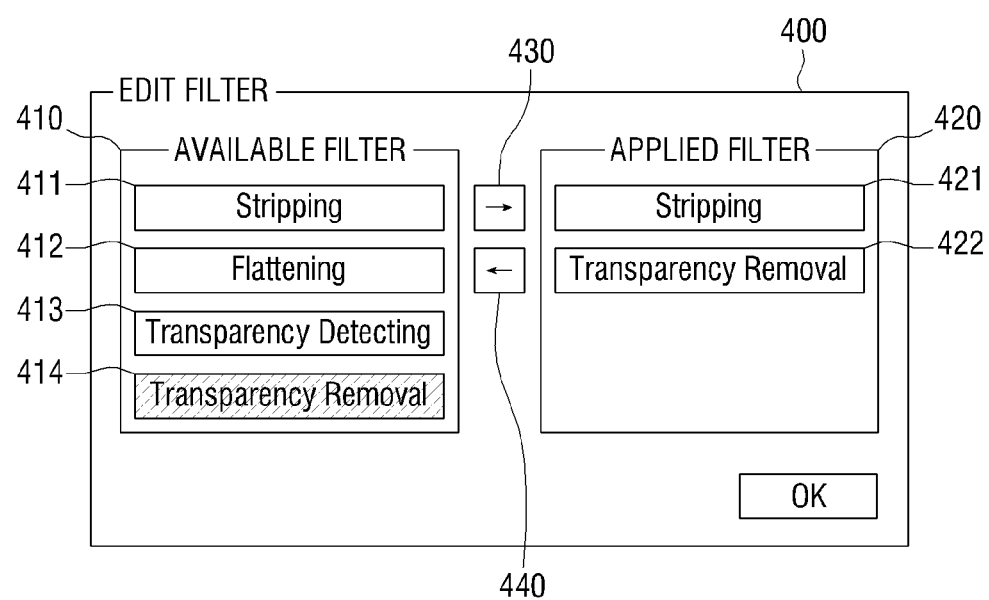

FIG. 4 is a view illustrating an example of a UI window 400 displayed on the terminal apparatus if the user selects a filter edition menu 240 of FIGS. 2 and 3.

Referring to FIG. 4, the UI window 400 may include an available filter area 410 to display filters which are available to the terminal apparatus (e.g., stripping filter 411, flattening filter 412, transparency detecting filter 413, and transparency removal filter 414), a filter applying area 420 to display a filter to be used for current optimization, and an add area 430 and a delete area 440 to add and delete filters. More specifically, the received selections of the filters may be displayed on the UI windows 200 and 300, respectively, as illustrated in FIGS. 2 and 3, and the filters may be added by selecting the add area 430 or may be deleted by selecting the delete area 440.

For example, if the user selects the stripping filter 411 and the transparency removal filter 414 from the available filter area 410 by adding them to the filter applying area 420 using add area 430, the stripping filter 421 and the transparency removal filter 422 of the applied filter area 410 may be displayed in the manual mode 220 of FIG. 2 and the recommendation mode 310 of FIG. 3. If the optimize option is the auto mode 210, only the filters displayed on the filter applying area 420 are applied or any one of filters available to the terminal apparatus can be selected regardless of the filters of the filter applying area 420.

The order of displaying the filters on the UI window may be changed, for example, according to a received selection. For example, if the stripping filter 421 and the transparency removal filter 422 are changed in their positions on the filter applying area 420, they are changed when being displayed on the UI window 200 of FIG. 2. The order of displaying the filters to be applied is changed according to the changed order.

Figure 5:
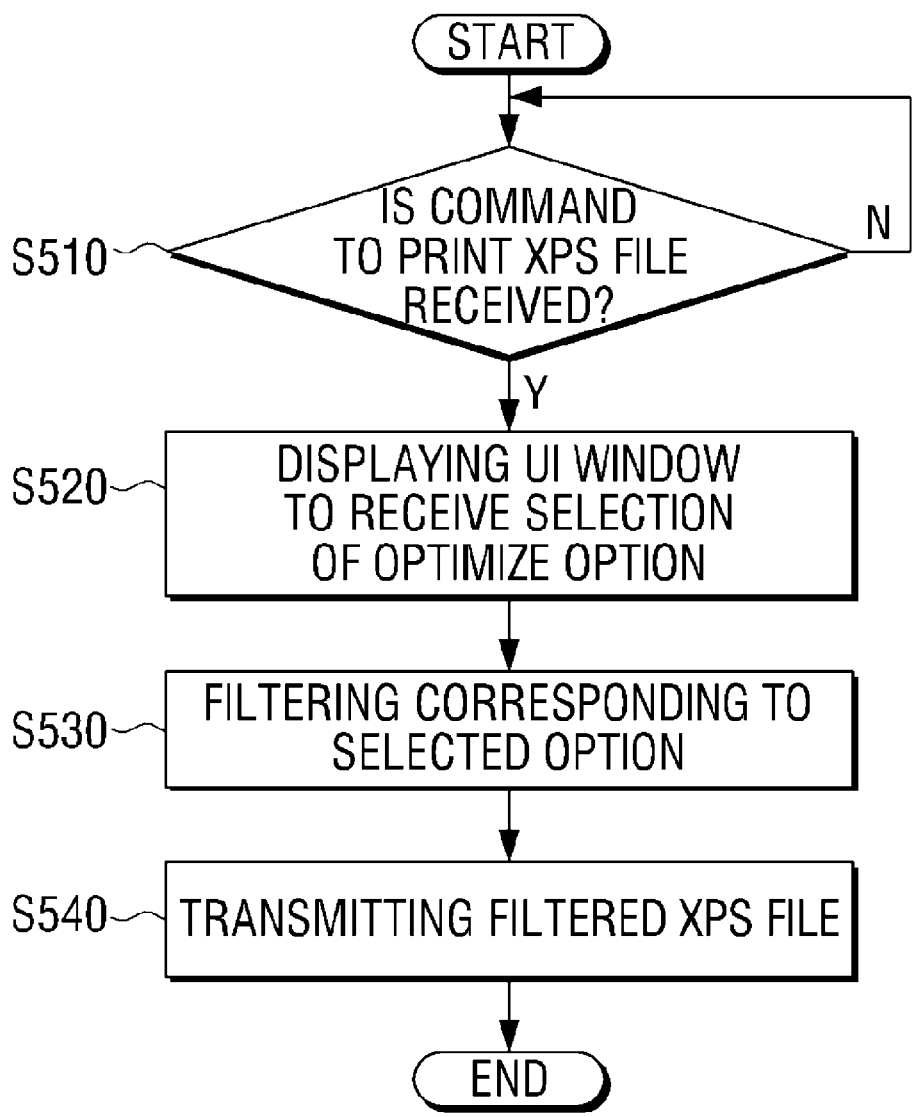
FIG. 5 is a flowchart illustrating a method of controlling printing operations according to an exemplary embodiment of the present general inventive concept.

FIG. 5 is a flowchart illustrating a method of controlling printing operations according to an exemplary embodiment of the present general inventive concept.

Referring to FIG. 5, if a command to print an XPS file is received in operation S510, an optimize option selection is received in operation S520. More specifically, a UI window is generated to display a first area to display an optimize option which can be selected by a user and at least one filter which can be applied to the XPS file, and a second area to receive user's corresponding selection. The UI window may receive a selection of an optimize option and at least one filter to be applied. The exemplary operation of receiving a optimize option selection through the user interface 120 of FIG. 1 is described above with reference to FIGS. 2 to 4. The operation of selecting the optimize option may be performed on a printer driver or an application. For example, if a command to print a corresponding document is applied through an application, the optimize option may be selected. Also, the optimize option may be provided as an option of a printer driver.

The XPS file is processed using at least one of the plurality of filters corresponding to the selected optimize option in operation S530. More specifically, the plurality of filters may include the stripping filter, the flattening filter, the transparency detection filter, and the transparency removal filter, and the XPS file is processed using at least one filter of the plurality of filters corresponding to the optimize option selected by the user. The plurality of filters perform the same operation as the filter provided in a conventional XPS pipeline as described above. The plurality of filters may include various filters provided in the XPS pipeline or a plug-in type filter in addition to the stripping filter, the flattening filter, the transparency detection filter, and the transparency removal filter.

The XPS file which has been processed is transmitted to the image forming apparatus in operation S540. More specifically, the XPS file which has been filtered using the plurality of filters corresponding to the user's selection is transmitted to the image forming apparatus. For example, if an image file is generated using the transparency removal filter, the image file is transmitted to the image forming apparatus. The filter which has been used may be displayed to the user. For example, if the optimize option selected by the user is the auto mode, the filter which has been used is displayed to the user so that the user can learn which filter has been used.

The XPS file which has been filtered by the at least one filter may be stored in a different XPS file name or may overwrite a XPS file already stored. This operation may be performed according to a user's selection or may be automatically performed without an extra user command.

Also, a history on the filter which has been used in the optimization or the pre-process which has been applied to the optimization may be stored. The corresponding history may be stored to the XPS file which has undergone the optimization or an extra history file may be generated to store the history. This operation may be performed according to a received user's selection or may be automatically performed without an extra user command.

Accordingly, the user can obtain information regarding the filter to be used and select a filter for the XPS file more easily. The method described in FIG. 5 can be executed in the terminal apparatus illustrated in FIG. 1 and also may be executed in another terminal apparatus having a different constitution.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A terminal apparatus to control a printing operation which is connectible to an image forming apparatus, the terminal apparatus comprising:
   a user interface to receive a selection of an optimize option when a command to print a XPS file is received;
   a filter unit to process the XPS file using at least one filter corresponding to the received selection of the optimize option;
   a controller to transmit the XPS file which has been processed by the filter unit to the image forming apparatus; and
   a storage unit to store the XPS file which has been processed by the filter unit, wherein the optimize option is at least one of an auto mode in which the filter is automatically selected according a performance of the image forming apparatus, a manual mode to receive a selection of which of the at least one filter is applied, and a recommendation mode in which at least one filter which is selected according to the performance of the image forming apparatus is displayed to the user and one or more selections of whether to apply each of the selected filters are received.

2. The terminal apparatus as claimed in claim 1, wherein the auto mode determines the performance of the image forming apparatus by a performance item of the image forming apparatus, and selects the at least one filter according to a result of determination.

3. The terminal apparatus as claimed in claim 1, wherein the user interface displays a filter which has been used to process the XPS file.

4. The terminal apparatus as claimed in claim 1, wherein the at least one filter comprises a transparency removal filter, and
wherein the auto mode selects the transparency removal filter when a memory capacity of the image forming apparatus is less than a pre-set capacity.

5. The terminal apparatus as claimed in claim 1, wherein the user interface generates a UI window to display a first area to display at least one filter which can be applied to the XPS file and a second area to receive a corresponding selection of the at least one filter.

6. The terminal apparatus as claimed in claim 5, wherein the at least one filter displayed on the first area is added or deleted by a received selection.

7. The terminal apparatus as claimed in claim 5, wherein the at least one filter displayed on the first area is changed in its display order by a received selection.

8. The terminal apparatus as claimed in claim 1, further comprising:
a storage unit to store a history on the filter which has been used to process the XPS file,
wherein the auto mode and the recommendation mode select the at least one filter according to the history.

9. A method of controlling a printing operation of a terminal apparatus which is connectible to an image forming apparatus, the method comprising:
receiving a command to print a XPS file;
receiving a selection of an optimize option according to the XPS file;
processing the XPS file using at least one filter corresponding to the received selection of the optimize option;
transmitting the XPS file which has been processed to the image forming apparatus; and
storing the XPS file which has been processed,
wherein the optimize option is at least one of an auto mode in which the filter is automatically selected according a performance of the image forming apparatus, a manual mode to receive a selection of which of the at least one filter is applied, and a recommendation mode in which at least one filter which is selected according to the performance of the image forming apparatus is displayed to the user and one or more selections of whether to apply each of the selected filters are received.

10. The method as claimed in claim 9, wherein the auto mode determines the performance of the image forming apparatus by a performance item of the image forming apparatus, and selects the at least one filter according to a result of determination.

11. The method as claimed in claim 9, further comprising displaying the filter which has been used to process the XPS file.

12. The method as claimed in claim 9, wherein the at least one filter comprises a transparency removal filter, and
wherein the auto mode selects the transparency removal filter when a memory capacity of the image forming apparatus is less than a pre-set capacity.

13. The method as claimed in claim 9, wherein the selecting the optimize option comprises generating a UI window to display a first area to display at least one filter which can be applied to the XPS file and a second area to receive a corresponding selection of the at least one filter.

14. The method as claimed in claim 13, wherein the at least one filter displayed on the first area is added or deleted by a received selection.

15. The method as claimed in claim 13, wherein the at least one filter displayed on the first area is changed in its display order by a received selection.

16. The method as claimed in claim 9, further comprising:
storing a history on the filter which has been used to process XPS file,
wherein the auto mode and the recommendation mode select the at least one filter according to the history.

17. The method as claimed in claim 9, wherein the selecting the optimize option is performed on a printer driver or an application.

18. A method of controlling a printing operation of a terminal apparatus connected to an image forming apparatus, the method comprising:
receiving a selection of an optimize option from a user interface of the terminal apparatus for a print command of a XPS file;
processing the XPS file with at least one filter in a filter unit of the terminal apparatus corresponding to the received selection of the optimize option; and
printing the processed XPS file with the image forming apparatus,
wherein the optimize option is at least one of an auto mode in which the filter is automatically selected according a performance of the image forming apparatus, a manual mode to receive a selection of which the at least one filter is applied, and a recommendation mode in which at least one filter which is selected according to the performance of the image forming apparatus is displayed to the user and one or more selections of whether to apply each of the selected filters are received.

* * * * *